W. GREGG.

Horse-Powers.

No. 118,232. Patented Aug. 22, 1871.

ATTEST
H. F. Eberts
Wyrow H. Church.

INVENTOR:
William Gregg,
per attorney
Thos. S. Sprague

UNITED STATES PATENT OFFICE.

WILLIAM GREGG, OF DANSVILLE, MICHIGAN, ASSIGNOR TO HIMSELF AND CHARLES NEWKIRK, OF SAME PLACE.

IMPROVEMENT IN STAKING HORSE-POWERS.

Specification forming part of Letters Patent No. 118,232, dated August 22, 1871.

*To all whom it may concern:*

Be it known that I, WILLIAM GREGG, of Dansville, in the county of Ingham and State of Michigan, have invented a new and useful Improvement in Staking Horse-Powers; and I do declare that the following is a true and accurate description thereof, reference being had to the accompanying drawing and to the letters of reference marked thereon, and being a part of this specification, in which—

Figure 1:
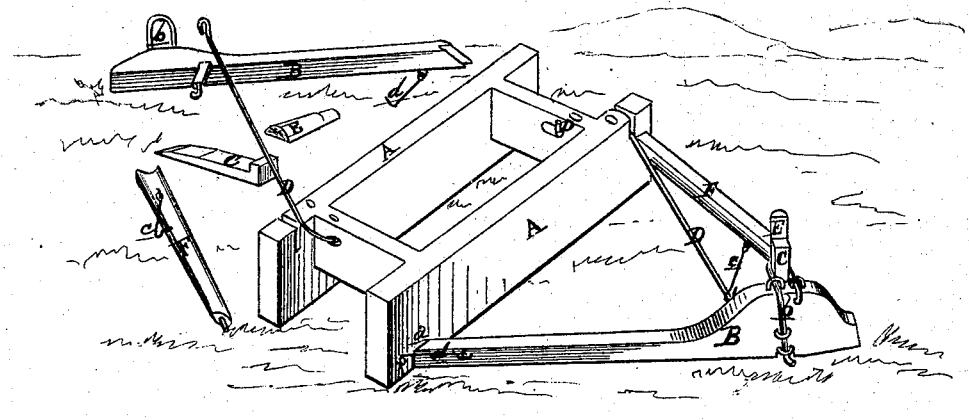
Figure 2:
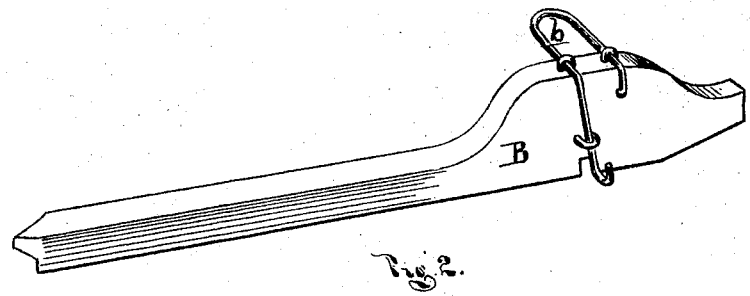

Figure 1 is a perspective view, showing one side of a horse-power frame staked to the ground; and Fig. 2 is a detached perspective view of one of the braces.

Similar letters of reference indicate corresponding parts in the several figures.

The nature of this invention relates to an improvement in the method of staking horse-powers to the ground, and is equally applicable to mounted and "down" or "ground" powers; and it consists in the peculiar arrangement of braces, stays, brace-stays, and keys with relation to the power-frame and stakes, as and for the purpose more fully hereinafter set forth.

In the drawing, A represents the frame of an ordinary ground-power. B are two wooden braces, one being used on each side of the frame, which has a socket, $a$, in the sill near the end for the reception of the end of said brace, the other end of which has secured to it on the top and outer side an iron yoke, $b$, by means of staples. The yoke is bent over to project toward the other end of the sill of the frame, while its lower end, projecting below the bottom of the brace, is turned outward to form a hook, as shown. C is the stake, which may be of iron, if used in frozen ground, driven through the yoke on the inner face of the brace. D is a brace-stay, the inner end of which is hooked through a hole in the girt of the frame, recessed in the top of the sill, and terminating in an eye which engages with the hook formed on the lower end of the yoke. One of these brace-stays is used at each side of the frame. The stake being driven, a key, E, is driven between it and the bale of the yoke, which brings a strain on the brace-stay D, when a wooden stay or strut, F, is wedged between the back of the key E and the end of the frame in the manner shown. The side of the sill should have a mortise or socket to receive a tenon or pin on the end of the brace or strut F before wedging down on the key, and a hook, $c$, should be pivoted on said strut so as to engage with the brace-stay and hold the former in place. A hook, $d$, might advantageously be placed on the inner end of the braces B to engage with an adjacent staple on the frame-sill and keep them together while staking the power. The strain being in the direction shown by the arrow, it will be seen that the stakes will be maintained in their vertical positions, so that if they be properly driven in firm ground they cannot be overturned; neither can they be moved bodily, and nothing but shearing them off at the surface of the ground will allow the frame to move.

What I claim as my invention, and desire to secure by Letters Patent, is—

The combination and arrangement, with the frame A of a horse-power, of the braces B B provided with the yokes $b\ b$, as described, the stakes C C, brace-stays D D, keys E E, and struts F F, as and for the purpose set forth.

WILLIAM GREGG.

Witnesses:
H. F. EBERTS,
CHAS. J. HUNT.